(12) United States Patent
Park et al.

(10) Patent No.: US 12,323,213 B2
(45) Date of Patent: Jun. 3, 2025

(54) WIDEBAND EXTREMELY LARGE ARRAY ANTENNA SYSTEM AND OFDM-BASED HYBRID BEAMFORMING METHOD FOR HYBRID-FIELD INTERFERENCE CONTROL OF THE SAME

(71) Applicant: Korea Advanced Institute of Science and Technology, Daejeon (KR)

(72) Inventors: Hyuncheol Park, Daejeon (KR); Hyunwoo Nam, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/352,124

(22) Filed: Jul. 13, 2023

(65) Prior Publication Data

US 2024/0162962 A1 May 16, 2024

(30) Foreign Application Priority Data

Nov. 16, 2022 (KR) ........................ 10-2022-0153701

(51) Int. Cl.
*H04B 7/06* (2006.01)
*H04B 7/04* (2017.01)
*H04L 5/00* (2006.01)

(52) U.S. Cl.
CPC .......... *H04B 7/066* (2013.01); *H04B 7/04026* (2023.05); *H04L 5/0023* (2013.01)

(58) Field of Classification Search
CPC .... H04B 7/066; H04B 7/04026; H04L 5/0023
See application file for complete search history.

(56) References Cited

U.S. PATENT DOCUMENTS

2016/0344463 A1* 11/2016 Kim ..................... H04B 7/0639

FOREIGN PATENT DOCUMENTS

KR 10-2022-0112110 A 8/2022

OTHER PUBLICATIONS

Korean Office Action, mailed Jan. 4, 2025, for Korean Application No. 10-2022-0153701, with Machine Generated English Translation, 11 pages.
Wang et al., "Sparse recovery method for far-field and near-field sources localization using oblique projection," The Journal of China Universities of Posts and Telecommunications, 20(3), pp. 90-96, Jun. 2013.

* cited by examiner

*Primary Examiner* — Janice N Tieu
(74) *Attorney, Agent, or Firm* — Lee & Hayes, P.C.

(57) ABSTRACT

This disclosure relates to a wideband extremely large array antenna system and an OFDM-based hybrid beamforming for hybrid-field interference control of the same. The wideband extremely large array antenna system for OFDM-based hybrid beamforming of this disclosure may include a transmitter having a plurality of transmit antennas, and a receiver capable of communication with the transmitter and having a plurality of receiving antennas, and the system may be configured to perform a first step for designing a common analog beamforming matrix for all subcarriers between the transmitter and the receiver, and a second step for designing a baseband beamforming matrix for each of the subcarriers.

7 Claims, 6 Drawing Sheets

Near-field    Far-field

WIDEBAND EXTREMELY LARGE ARRAY ANTENNA SYSTEM AND OFDM-BASED HYBRID BEAMFORMING METHOD FOR HYBRID-FIELD INTERFERENCE CONTROL OF THE SAME

This application claims the priority benefit of Korean Patent Application No. 10-2022-0153701, filed on Nov. 16, 2022, in the Korean Intellectual Property Office, the disclosure of which is incorporated herein by reference.

BACKGROUND

Field of the Invention

The present disclosure relates to a wideband extremely large array antenna system and an OFDM (Orthogonal Frequency Division Modulation)-based hybrid beamforming (also referred to as precoding) method for hybrid-field interference control of the same.

Description of Related Art

Beamforming technology is a technology for concentrating transmit signals in a specific direction using multiple antennas. Particularly, in ultra-high frequency channels such as subterahertz (0.1 to 1 THz) considered in a beyond 5G mobile communication system, it is easy to secure a wide bandwidth, and since hundreds of and thousands of antennas may be used due to very short wavelength, high pathloss can be overcome by forming a narrow beam width. To apply existing MIMO (Multiple Input Multiple Output) technology by using multiple antennas, many RF (Radio Frequency) chains are required as the number of antennas, but when a large number of antennas are used, hardware complexity and power consumption greatly increase, making system implementation impossible. To solve this, a digital-analog hybrid beamforming structure using the much smaller number of RF chains compared to the number of antennas is used. Analog beamforming acquires antenna beamforming gain, and baseband digital beamforming acquires multiplexing gain, thereby approaching to digital beamforming performance. Here, an analog beamforming block has a structure composed of only an RF phase shift capable of controlling only phase of a signal in order to reduce circuit complexity.

Spatial sparsity occurs in an ultra-high frequency channel between transceivers in a wideband multi-antenna system using hundreds or thousands of antennas due to physical characteristics such as pathloss and the like. When the spatial sparsity exists, beamforming gain between the transceivers may be effectively acquired by forming the analog beamforming in a physical channel forming direction. When an OFDM system is used to remove ISI (Inter-symbol Interference) of a wideband channel, after a digital signal in frequency domain processes IDFT (Inverse Discrete Fourier Transform) signal, one analog signal is generated through the RF chain. An OFDM-based hybrid beamforming system designs one well-designed analog beamforming for all digital signals in the frequency domain by designing analog beamforming to acquire beam gain of an analog signal, so it is difficult to form independent beam for each user or each stream, and since baseband beamforming is designed as many as the number of subcarrier channels for effective channels of all subcarriers taken DFT (Discrete Fourier Transform)/IDFT, it is difficult to optimize frequency resource efficiency due to hardware structural limitations.

Since it is easy to improve data rate when the antenna gain is acquired through an analog beamforming design suitable for baseband beamforming of each subcarrier, a transmitter and a receiver must form analog beamforming suitable for a channel to maximize data rate of a hybrid beamforming system.

Due to very short wavelength, time delay occurred in transmitting/receiving signals between antennas has a non-negligible value. Since antennas densely packed in a certain area are used, signals transmitted and received by shorten wavelength no longer follow plane waves. A near-field and a far-field are independent according to the distance between the transceivers, but the beam shape forming the channel has a dependency. A new standard steering beam shape suitable for channel characteristics mush be configured, and analog beamforming suitable for the wideband system must be formed.

SUMMARY

In a XL-MIMO (Extremely Large Multi-Input Multi-Output) based wideband system, i.e., a wideband extremely large array antenna system, since Rayleigh distance increases according to a large antenna aperture, a near-field and a far-field simultaneously exist, so a beamforming design for hybrid-field interference control is required. A method for designing analog beamforming in order to mitigate hybrid-field interference in a transmitter or decomposing digital beamforming of total antenna size into a hybrid beamforming structure is not optimal from a viewpoint of data rate considering all subcarrier channels. Baseband beamforming has a high degree of freedom as digital signal processing for each of all subcarriers is possible, but after channel information of actual antenna size goes through an analog beamforming block, only channel information of RF chain size taken DFT/IDFT may be used. In other words, since the baseband beamforming may use only some channel information going through an analog beamforming matrix, the analog beamforming may improve data rate by simultaneously mitigating hybrid-field interference and maximizing beam gain in order to maximally extract receiving signals.

The disclosure proposes a wideband hybrid beamforming system using the number of RF chains less than or equal to the number of antennas and a two-step OFDM-based hybrid beamforming method for improving data rate through an analog beamforming design that mitigates hybrid-field interference of the same. Particularly, the disclosure proposes a method for improving data rate by designing an analog beamforming matrix to maximize the data rate by using a near-field, a far-field, and channel information of subcarriers in first step and designing a baseband beamforming matrix to maximize the data rate in second step.

The disclosure proposes a wideband extremely large array antenna system and an OFDM (Orthogonal Frequency Division Modulation) based hybrid beamforming method for hybrid-field interference control of the same.

An OFDM (Orthogonal Frequency Division Modulation) based hybrid beamforming method of a wideband extremely large array antenna system of the disclosure may include designing a common analog beamforming matrix for all subcarriers between a transmitter and a receiver, and designing a baseband beamforming matrix for each of the subcarriers.

A wideband extremely large array antenna system for OFDM-based hybrid beamforming of the disclosure may include a transmitter having a plurality of antennas, and a receiver capable of communication with the transmitter and having a plurality of receiving antennas, and the system may be configured to perform a first step for designing a common analog beamforming matrix for all subcarriers between the transmitter and the receiver, and a second step for designing a baseband beamforming matrix for each of the subcarriers.

A computer program of the disclosure may be stored for a wideband extremely large array antenna system to execute an OFDM-based hybrid beamforming method, and the method may include designing a common analog beamforming matrix for all subcarriers between a transmitter and a receiver, and designing a baseband beamforming matrix for each of the subcarriers.

The disclosure is applicable to a communication system to which a beyond 5G mobile communication system and other wideband OFDM hybrid beamforming systems are applied. The disclosure may be applied to millimeter wave (30 GHz-300 GHz) and subterahertz (0.1 THz-1 THz) beamforming which are core technologies of 5G and beyond 5G mobile communication systems. The millimeter wave and subterahertz communication technologies are receiving a lot of attention not only from academia but also from industry, and through the disclosure, it is possible to achieve technical superiority in beyond 5G mobile communication markets. According to the disclosure, the wideband extremely large array antenna system may significantly increase data rate compared to existing technologies through an OFDM-based optimal hybrid beamforming design that technically maximizes data rate of a multi-user downstream link. Furthermore, the wideband extremely large array antenna system will be able to lead beyond 5G mobile communication technology markets by economically applying it to subterahertz beamforming.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Hereinafter, embodiments of the disclosure are described in detail with reference to the accompanying drawings.

Hereinafter, beam may represent an antenna pattern formed according to a weight vector multiplied by antenna array at a transceiver. For reference, a beam dictionary may represent a set of beam pattern candidates that may be configured according to azimuth up and down angles at the transceiver. A beam squint may represent a beam distortion phenomenon that occurs in a wideband channel.

Figure 1:
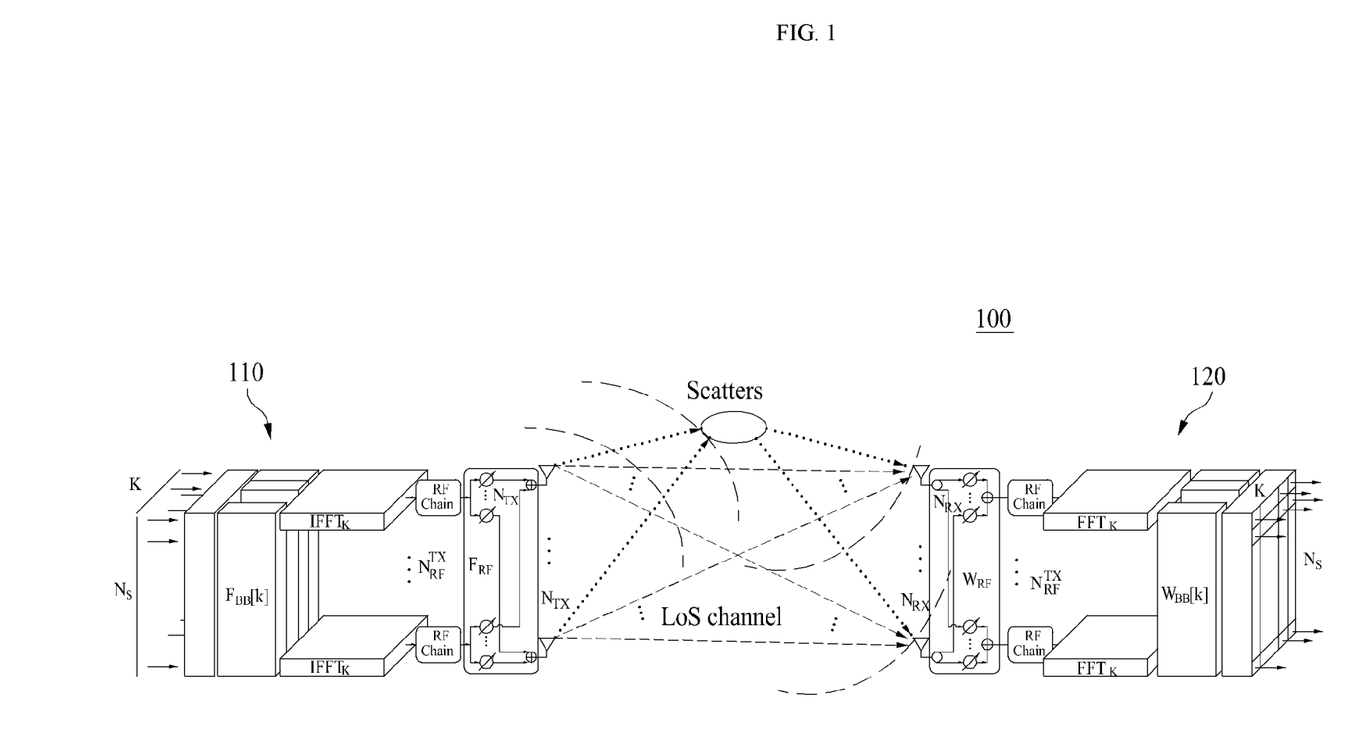
FIG. 1 is a drawing illustrating a wideband extremely large array antenna system according to various example embodiments.
Figure 2:
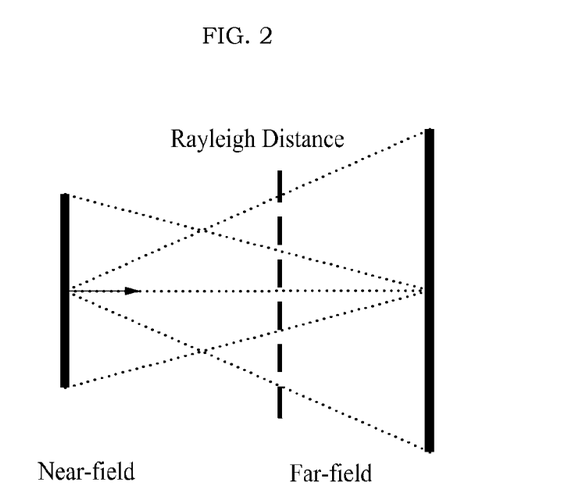
FIG. 2 a drawing for describing a hybrid-field based on Rayleigh distance.

FIG. 1 is a drawing illustrating a wideband extremely large array antenna system 100 according to various example embodiments, and FIG. 2 a drawing for describing a hybrid-field based on Rayleigh distance.

Referring to FIG. 1, the wideband extremely large array antenna system 100 may include a transmitter 110 and at least one receiver 120. The transmitter includes a plurality $N_{TX}$ of transmitting antennas, and the receiver 120 includes a plurality $N_{RX}$ of receiving antennas, and such transmitting antennas and receiving antennas may configure a wideband extremely large array antenna. The transmitter 110 and the receiver 120 may communicate based on OFDM (the total number of subcarriers is K) by using the transmitting antennas and the receiving antennas respectively. The transmitter 110 may use a plurality $N_{RF}^{TX}$ of RF chains, and the receiver may use a plurality $N_{RF}^{RX}$ of RF chains. In the transmitter 110, the number $N_{RF}^{TX}$ of RF chains is less than or equal to the number $N_{TX}$ of transmitting antennas, and in the receiver 120, the number $N_{RF}^{RX}$ of RF chains is less than or equal to the number $N_{RX}$ of receiving antennas. Here, there may be data stream between the transmitter 110 and the receiver 120, and the number $N_S$ of data stream may be greater than or equal to 0, and may be less than or equal to a smaller value among the number $N_{RF}^{TX}$ of RF chains of the transmitter 110 and the number $N_{RF}^{RX}$ of RF chains of the receiver 120 ($0 \leq N_S \leq \min(N_{RF}^{TX}, N_{RF}^{RX})$).

In the wideband extremely large array antenna system 100, as shown in FIG. 2, a Rayleigh distance ($D_{Rayleigh} = 2A^2/\lambda_c$, here, $\lambda_c$ representing wavelength) representing a boundary line between a far-field and a-near field according to large antenna aperture A increases, so that the near-field and the far-field exist simultaneously, and there any be hybrid-field interference. Here, the near-field may represent a near EM (Electromagnetic) field based on the Rayleigh distance according to the antenna aperture, and the far-field may represent a far EM field based on the corresponding Rayleigh distance.

Therefore, the wideband extremely large array antenna system 100 may perform two-step hybrid beamforming design for hybrid-field interference control. The wideband extremely large array antenna system 100 may perform the two-step hybrid beamforming design by using CSI (Channel Staten Information) for each subcarrier. At this time, the wideband extremely large array antenna system 100 may design an analog beamforming matrix in order to maximize beam gain and mitigate hybrid-field interference simultaneously by acquiring an oblique projection matrix of the far-field by using AoD (Angle of Departure) and AOA (Angle of Arrival) information between the transmitter 110 and the receiver 120 and an oblique projection matrix of the near-field by using an inverse matrix, and then, may follow a process for designing a baseband beamforming matrix for effective channel information for each subcarrier.

Particularly, the wideband extremely large array antenna system 100 may find the oblique projection matrixes of the far-field and the near-field by using a dominant eigenvector of hybrid-field in first step, and by using this, may design common analog beamforming matrixes suitable for the far-field and the near-field. The wideband extremely large array antenna system 100 may set the far-field by using the AoA and AoD information, and design channel information orthogonal thereto as the near-field so that the common analog beamforming matrix acquired from the hybrid-field may be designed not to affect other fields. Here, the wideband extremely large array antenna system 100 may search for a candidate group for each subcarrier for a common analog design for each subcarrier, and may extract a dominant eigenvector through eigenvalue decomposition as many as the number of final RF chains among the entire dominant eigenvectors, and finally an analog beamforming matrix $F_{RF}$ in the transmitter 110 may be designed. Then, the wideband extremely large array antenna system 100 may design a baseband beamforming matrix for each subcarrier by using the dominant eigenvalue for data rate maximization problem as baseband beamforming may be designed for effective channel for each subcarrier in the second step. Here, the wideband extremely large array antenna system 100 may design a baseband beamforming matrix $F_{BB}[k]$ corresponding to kth subcarrier in the transmitter 110.

In a downlink multi-user environment, an OFDM-based channel model of the wideband extremely large array antenna system 100 may be defined as [Equation 1] below.

$$H_d = H_{LOS,d} + H_{NLOS,d},$$ [Equation 1]

$$[H_{LOS,d}]_{m,n} = \frac{1}{r_{LOS,m,n}} e^{-j\frac{2\pi}{\lambda_c}(r_{LOS,m,n} - r_{LOS})},$$

$$[H_d]_{m,n} = \sum_{l=1}^{L} \frac{e^{j\frac{2\pi}{\lambda_c}(r^{RX}_{NLOS,l} - r^{TX}_{NLOS,l})}}{r^{TX}_{NLOS,l,m} r^{RX}_{NLOS,l,n}} p_{RC}\left(dT_s - \left(\frac{r^{RX}_{NLOS,l,m} + r^{TX}_{NLOS,l,n}}{c}\right)\right)$$

$$e^{-j\frac{2\pi}{\lambda_c}(r^{RX}_{NLOS,l,m} - r^{TX}_{NLOS,l,n})},$$

$$H[k] = \sum_{d=1}^{D} H_d e^{-j\frac{2\pi k d}{K}} \in \mathbb{C}^{N_{RX} \times N_{TX}}.$$

Here, $H_d (\in \mathbb{C}^{N_{RX} \times N_{TX}})$ represents a MIMO cluster channel according to delay d between the transmitter 110 and the receiver 120 having sampling time $T_S$ in a time area, and due to characteristics of XL-MIMO, delay for each antenna and spherical wave are reflected, and $H[k](\in \mathbb{C}^{N_{RX} \times N_{TX}})$ may represent a channel between the transmitter 110 and the receiver 120 for kth subcarrier in an OFDM-based frequency area. Also, $f_c$ and $\lambda_c$ represent central frequency and wavelength respectively, L represents the number of scatters configuring a NLoS channel between the transmitter 110 and the receiver 120, $p_{RC}(\bullet)$ represents a pulse-shaping function, $r^{RX}_{NLOS,l,m}$ represents a distance from mth receiving antenna to a scatter located in l path, $r^{TX}_{NLOS,l,n}$ represents a distance from nth transmitting antenna to a scatter located in l path, $r_{LOS}$ represents a distance between the transmitting antenna and the receiving antenna which are standard, $r_{LOS,m,n}$ represents a distance between nth transmitting antenna and mth receiving antenna based on $r_{LOS}$, and $R_{LD}$ may represent a reference distance for hybrid-field division according to antenna aperture and wavelength $$\left(R_{LD} = 2\frac{D^2}{\lambda}\right).$$

A receiving signal on the kth subcarrier and a signal passed through the receiver 120 may be defined as [Equation 2] below.

$$x[k] = \sqrt{P_t} H[k] F_{RF} F_{BB}[k] s[k] + n[k]$$

$$y[k] = W_{BB}^H[k] W_{RF}^H x[k]$$ [Equation 2]

At this time, it is $$\mathbb{E}\left[s[k]s^H[k]\right] = \frac{1}{N_s} I, \forall k.$$

Here, $P_t$ represents transmit power, $P_n$ represents noise power, s[k] represents a transmitting signal transmitted from the transmitter 110 through the kth subcarrier, x[k] represents a receiving signal received by the receiver 120 through the kth subcarrier, $$F_{RF}\left(\in \mathbb{C}^{N_{TX} \times N_{RF}^{TX}}\right)$$

represents an analog beamforming matrix in the transmitter 110, $$F_{BB}[k]\left(\in \mathbb{C}^{N_{RF}^{TX} \times N_s}\right)$$

represents a baseband beamforming matrix corresponding to the kth subcarrier in the transmitter 110, n[k] represents a noise in the kth subcarrier, y[k] represents a signal passed through the receiver 120, $$W_{BB}\left(\in \mathbb{C}^{N_{RF}^{RX} \times N_s}\right)$$

represents a baseband beamforming matrix corresponding to the kth subcarrier in the receiver 120, $$W_{RF}\left(\in \mathbb{C}^{N_{RX} \times N_{RF}^{RX}}\right)$$

represents an analog beamforming matrix in the receiver 120, $[\bullet]^H$ represents conjugate transpose, $\mathbb{E}[\bullet]$: represents an expectation operator, and $I_K$ may represent a K×K identity matrix.

Analog beamforming and baseband beamforming design problems of the transmitter 110 through the data rate maximization problem may be set. When subcarrier channel information is known, a hybrid beamforming design maximizing entire data rate of the wideband extremely large array antenna system 100 may be expressed as an equation reflecting RF element constraint as [Equation 3] below.

$$\underset{F_{RF}, F_{BB}[k], W_{RF}, W_{BB}[k], \forall k}{\arg\max} R$$ [Equation 3]

$$\text{s.t. } |[F_{RF}]_{i,j}| = 1, \forall i, j$$

$$\text{trace}\left(F_{RF} F_{BB}[k] F_{BB}^H[k] F_{RF}^H\right) = N_s, \forall k$$

$$|[W_{RF,u}]_{i,j}| = 1, \forall i, j, u$$

$$F_{BB}[k] \in \mathbb{C}^{N_{RF}^{RX} \times N_s}$$

$$R = \frac{1}{K}$$

$$\sum_{k=1}^{K} \log_2 \left| I + R_I^{-1}[k] W_{BB}^H[k] W_{RF}^H H[k] F_{RF} F_{BB}[k] F_{BB}^H[k] F_{RF}^H H^H[k] W_{RF} W_{BB}[k] \right|$$

$$R_I = \frac{N_s \sigma_n^2}{P_t} W_{BB}^H[k] W_{RF}^H W_{RF} W_{BB}[k]$$

As described above, the wideband extremely large array antenna system 100 is a system composed of the analog beamforming and the baseband beamforming for each subcarrier to reduce the number of RF chains compared than the number of antennas in order to reduce hardware complexity and compensate it, and physically one analog beamforming block for all subcarrier digital signal connected to one RF chain may be configured. By forming oblique projection matrixes corresponding to the far-field and the near-field by using all subcarrier channel information and designing analog beamforming matrix, hybrid-field interference control and characteristics of hybrid beamforming structure are reflected, and by using effective channel information of frequency band, baseband beamforming matrix may be designed to maximize entire data rate.

In the disclosure, when the AoA and AoD information between the transmitter 110 and the receiver 120 and subcarrier channel information are known, the problem of maximizing the data rate is set, and when considering the constraint that the transmitter 110 and the receiver 120 have a hybrid beamforming structure, a problem such as [Equation 4] below may be set.

$$\underset{F_{RF}, F_{BB}[k], W_{RF}, W_{BB}[k], \forall k}{\operatorname{argmax}} R \qquad \text{[Equation 4]}$$

s.t. $|[F_{RF}]_{i,j}| = 1, \forall i, j$ $\operatorname{trace}(F_{RF} F_{BB}[k] F_{BB}^H[k] F_{RF}^H) = N_s, \forall k$ $|[W_{RF}]_{i,j}| = 1, \forall i, j$ $F_{BB}[k] \in \mathbb{C}^{N_{RF}^{RX} \times N_s}$ $R = \dfrac{1}{K}$ $\sum_{k=1}^{K} \log_2 |I + R_I^{-1}[k] W_{BB}^H[k] W_{RF}^H H[k] F_{RF} F_{BB}[k] F_{BB}^H[k] F_{RF}^H H^H[k] W_{RF} W_{BB}[k]|$ $R_I = \dfrac{N_s \sigma_n^2}{P_t} W_{BB}^H[k] W_{RF}^H W_{RF} W_{BB}[k]$ In the disclosure, it tries to solve a problem of designing precoder, and since orthogonality between the far-field and the near-field is established when using the oblique projection matrix, the hybrid beamforming may be designed to maximize transmitting and receiving signals between fields. The wideband extremely large array antenna system 100 may consider the baseband beamforming matrix for the effective channel to maximize the entire data rate, and from this, optimally design the analog beamforming matrix commonly applied from the data rate maximization problem to the analog beamforming matrix, and then, design the baseband beamforming matrix for each subcarrier. Particularly, the wideband extremely large array antenna system 100 selects oblique projection matrixes of the far-field and the near-field in the given channel information by using the AoA and AoD information, and decomposes the hybrid-field into the near-field and the far field which are orthogonal to each other. A common analog beamforming matrix may be designed by extracting a dominant eigenvector among the analog beamforming matrix corresponding to all subcarriers through eigenvalue decomposition for decomposed information in each field. Then, the wideband extremely large array antenna system 100 may design the baseband beamforming matrix for maximizing the data rate for the effective channel for each subcarrier.

Figure 3:
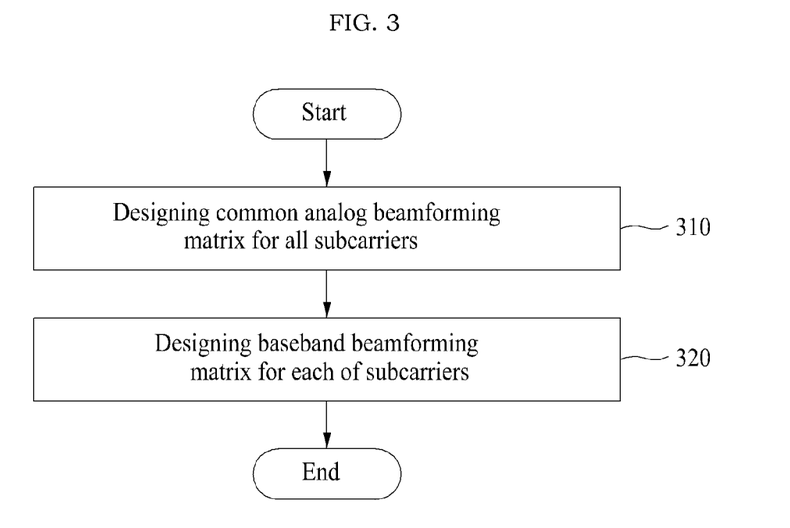
FIG. 3 is a drawing illustrating a method of a wideband extremely large array antenna system according to various example embodiments.

FIG. 3 is a drawing illustrating a method of a wideband extremely large array antenna system 100 according to various example embodiments.

Referring to FIG. 3, the wideband extremely large array antenna system 100 may design a common analog beamforming matrix for all subcarriers between a transmitter 110 and a receiver 120 in Step 310. It may correspond to first step of a two-step hybrid beamforming design. The wideband extremely large array antenna system 100 may design a common analog beamforming by dividing channel information of a system data rate maximization problem into a near-field and a far-field. The wideband extremely large array antenna system 100 may design a common analog beamforming matrix of entire baseband beamforming matrix reflecting hybrid-field interference control and characteristics of a hybrid beamforming structure in order to maximize the data rate as [Equation 5] below.

$$\underset{F_{RF}}{\operatorname{argmax}} \dfrac{1}{K} \sum_{k=1}^{K} \log_2 |I + R_I^{-1}[k] F_{RF}^H \overline{H}^H[k] \overline{H}[k] F_{RF}| \qquad \text{[Equation 5]}$$

s.t. $|[F_{RF}]_{i,j}| = 1, \forall i, j$

Here, it is supposed that the receiver 120 designs the hybrid beamforming in order to maximize a receiving signal from the transmitter 110, and $\overline{H}[k] = \tilde{W}_{BB}^H[k] W_{RF}^H H[k]$ may represent an effective channel therefor. For a beamforming matrix $\tilde{W}_{BB}[k]$ for each subcarrier of the receiver 120, after the hybrid beamforming design is completed in the transmitter 110, the baseband beamforming matrix is finally designed through alignment for each data stream, and regarding this, it will be additionally described later in Step 320.

The wideband extremely large array antenna system 100 tries to design an analog beamforming matrix to maximize the hybrid-field interference after designing an oblique projection matrix from the given channel information by using AoA and AoD information as [Equation 6] below.

$$R_T = \dfrac{1}{K} \sum_{k=1}^{K} \log_2 |I + R_I^{-1}[k] F_{RF}^H \overline{H}^H[k] \overline{H}[k] F_{RF}| \qquad \text{[Equation 6]}$$

$$= \dfrac{1}{K} \sum_{k=1}^{K} \log_2 |I + R_I^{-1}[k] F_{RF}^H (R_{NF}[k] + R_{FF}[k]) F_{RF}|$$

Here, $R_{FF}[k]$ is a symmetric matrix corresponding to a far-field, and it may be acquired by forming an array response vector set $A_{TX}$ by using AoD information and forming the oblique projection matrix as below [Equation 7].

$$A_{TX} = U_{A_{TX}} \Sigma_{A_{TX}} V_{A_{TX}}^H, \qquad \text{[Equation 7]}$$

$$\hat{A}_{TX} = U_{A_{TX}} \begin{bmatrix} I_{M_{TX}} \\ 0 \end{bmatrix},$$

$$M_{TX} = \min(L, N_{TX})$$

$$P_{FF} = \hat{A}_{TX} (\hat{A}_{TX}^H \hat{A}_{TX})^{-1} \hat{A}_{TX}^H, H[k] P_{FF} = U_{FF} \Sigma_{FF} V_{FF}^H,$$

$$H^c[k] = H[k](I - P_{FF}) = U_{NF} \Sigma_{NF} V_{NF}^H,$$

$$P_{NF} = V_{NF} (V_{NF}^H V_{NF})^{-1} V_{NF}^H$$

$$\sqrt{\phantom{x}} \therefore E_{FF|NF}^{TX} = A_{TX} (|A_{TX}^H (I - P_{NF}) A_{TX})^{-1} A_{TX}^H (I - P_{NF}),$$

$$E_{NF|FF}^{TX} = V_{NF} (V_{NF}^H (I - P_{FF}) V_{NF})^{-1} V_{NF}^H (I - P_{FF})$$

Finally, the channel of the near-field and the far-field may be expressed by using the oblique projection matrix as [Equation 8] below.

$$H_{FF}^{TX}[k]=H[k](E_{FF|NF}^{TX})^H, H_{NF}^{TX}[k]=H[k](E_{NF|FF}^{TX})^H$$

$$H_{FF}^{RX}[k]=E_{FF|NF}^{RX}H[k], H_{NF}^{RX}[k]=E_{NF|FF}^{RX}H[k] \quad \text{[Equation 8]}$$

The wideband extremely large array antenna system 100 may obtain [Equation 9] below by using singular value decomposition after accumulating a virtual analog beamforming matrix for each subcarrier into one matrix to design the common analog beamforming matrix for all subcarriers.

$$H_{FF}^{TX}[k]=U_{FF}^{TX}[k]\Lambda_{FF}^{TX}[k]V_{FF}^{TX}[k]^H$$

$$H_{NF}^{TX}[k]=U_{NF}^{TX}[k]\Lambda_{NF}^{TX}[k]V_{NF}^{TX}[k]^H$$

$$H_{NF}^{RX}[k]=U_{FF}^{RX}[k]\Lambda_{FF}^{RX}[k]V_{FF}^{RX}[k]^H$$

$$H_{FF}^{RX}[k]=U_{NF}^{RX}[k]\Lambda_{NF}^{RX}[k]V_{NF}^{RX}[k]^H$$

$$F_{RF}[k]=(\hat{V}_{FF}^{TX}[k]\hat{\Lambda}_{FF}^{TX}[k]+\hat{V}_{NF}^{TX}[k]\hat{\Lambda}_{NF}^{TX}[k])$$

$$W_{RF}[k]=(\hat{U}_{FF}^{RX}[k]\hat{\Lambda}_{FF}^{RX}[k]+\hat{U}_{NF}^{RX}[k]\hat{\Lambda}_{NF}^{RX}[k]) \quad \text{[Equation 9]}$$

The wideband extremely large array antenna system 100 may extract dominant eigenvectors as many as the number of RF chains as [Equation 10] below. At this time, it may be supposed that a diagonal matrix Λ[k] is aligned in descending order.

$$F_{RF,T} = [F_{RF}[1], \cdots, F_{RF}[K]]$$

$$W_{RF,T} = [W_{RF}[1], \cdots, W_{RF}[K]]$$

$$F_{RF,T} = U_{F_{RF,T}} S_{F_{RF,T}} V_{F_{RF,T}}^H$$

$$W_{RF,T} = U_{W_{RF,T}} S_{W_{RF,T}} V_{W_{RF,T}}^H$$

$$F_{RF}^{UC} = U_{F_{RF,T}} \begin{bmatrix} I_{N_{RF}^{TX}} \\ 0 \end{bmatrix}$$

$$W_{RF}^{UC} = U_{W_{RF,T}} \begin{bmatrix} I_{N_{RF}^{RX}} \\ 0 \end{bmatrix} \quad \text{[Equation 10]}$$

The wideband extremely large array antenna system 100 may design a common analog beamforming matrix which will be actually applied to all subcarriers by extracting dominant eigenvectors through eigenvalue decomposition of the virtual analog beamforming matrix for each subcarrier. At this time, phase information may be extracted according to power constraint of the analog beamforming structure.

Such Step 310 may be summarized as an algorithm as disclosed in [Table 1] below.

TABLE 1

Algorithm 1: Unconstrained analog beamforming design using unitary matrix

Input: $V_{RF}^{UC}$, δ, η
 δ is error between unconstrained and constrained analog beamforming,
 η is iteration limit
 limit, k = 0
 1. Setting initial value $F_{RF}$ through phase extraction from $V_{RF}^{UC}$
    $F_{RF}^{tmp} = \arg(V_{RF}^{UC})$
 2. Performing iterative algorithm by using δ and η
    While (( δ≤ |$V_{RF}^{UC}$− $F_{RF}^{tmp}|_F^2$)||(k≤ η))
    $U_F \Sigma_F V_F^H =(k_{RF}^{UC})^H F_{RF}$
    $U_P = U_F V_F^H$
    $F_{RF}^{tmp} = \arg(V_F U_P)$
    k = k + 1
 End
    $F_{RF} = F_{RF}^{tmp}$
Output: $F_{RF}$ Next, the wideband extremely large array antenna system 100 may design the baseband beamforming matrix for each of subcarriers in Step 320. This may correspond to second step of the two-step hybrid beamforming design. The wideband extremely large array antenna system 100 may design a baseband beamformer for an effective channel for each subcarrier of each user. The wideband extremely large array antenna system 100 may design the baseband beamforming matrix for the effective channel passed through the common analog beamforming matrix designed in the first step as [Equation 11] below.

$$R_T = \frac{1}{K}\sum_{k=1}^K \log_2 \left| I + R_I^{-1}[k]F_{BB}^H[k]\tilde{H}^H[k]\tilde{H}[k]F_{BB}[k] \right| \quad \text{[Equation 11]}$$

Here, $\tilde{H}[k]=\overline{H}[k]F_{RF}$, may represent an effective channel due to the common analog beamforming matrix designed in the first step.

Such designed baseband beamforming matrix is configured with dominant eigenvectors for each user, but matching for each data stream between the transmitter 110 and the receiver 120 is not performed, so data stream between the transmitter 110 and the receiver 120 is finally aligned through singular value decomposition as [Equation 12] below.

$$U[k]\Sigma[k]V[k]^H = \tilde{W}_{BB}^H[k]W_{RF}^H H[k]F_{RF}\tilde{F}_{BB}[k] \quad \text{[Equation 12]}$$

$$\therefore W_{BB}[k] = \tilde{W}_{BB}[k]U[k],$$

$$F_{BB}[k] = \frac{\sqrt{N_s}}{\left\|F_{RF}\tilde{F}_{BB}[k]V[k]\right\|_F}\tilde{F}_{BB}[k]V[k]$$

Here, $$\frac{\sqrt{N_s}}{\left\|F_{RF}\tilde{F}_{BB}[k]V[k]\right\|_F}$$

may represent power normalization according to power constraint of a base station.

Figure 4A:
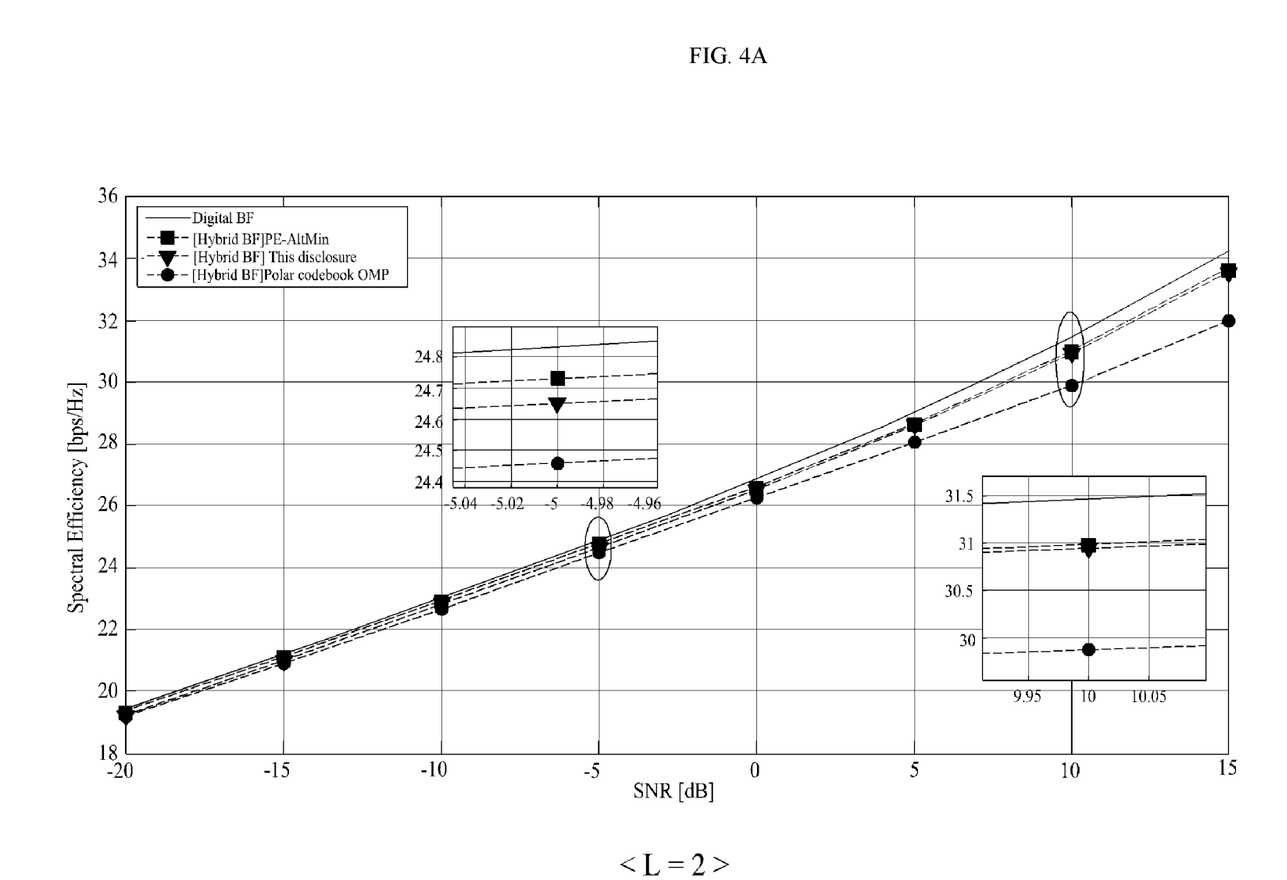
FIGS. 4A, 4B, and 4C are drawings showing simulations results related to the disclosure.
Figure 4B:
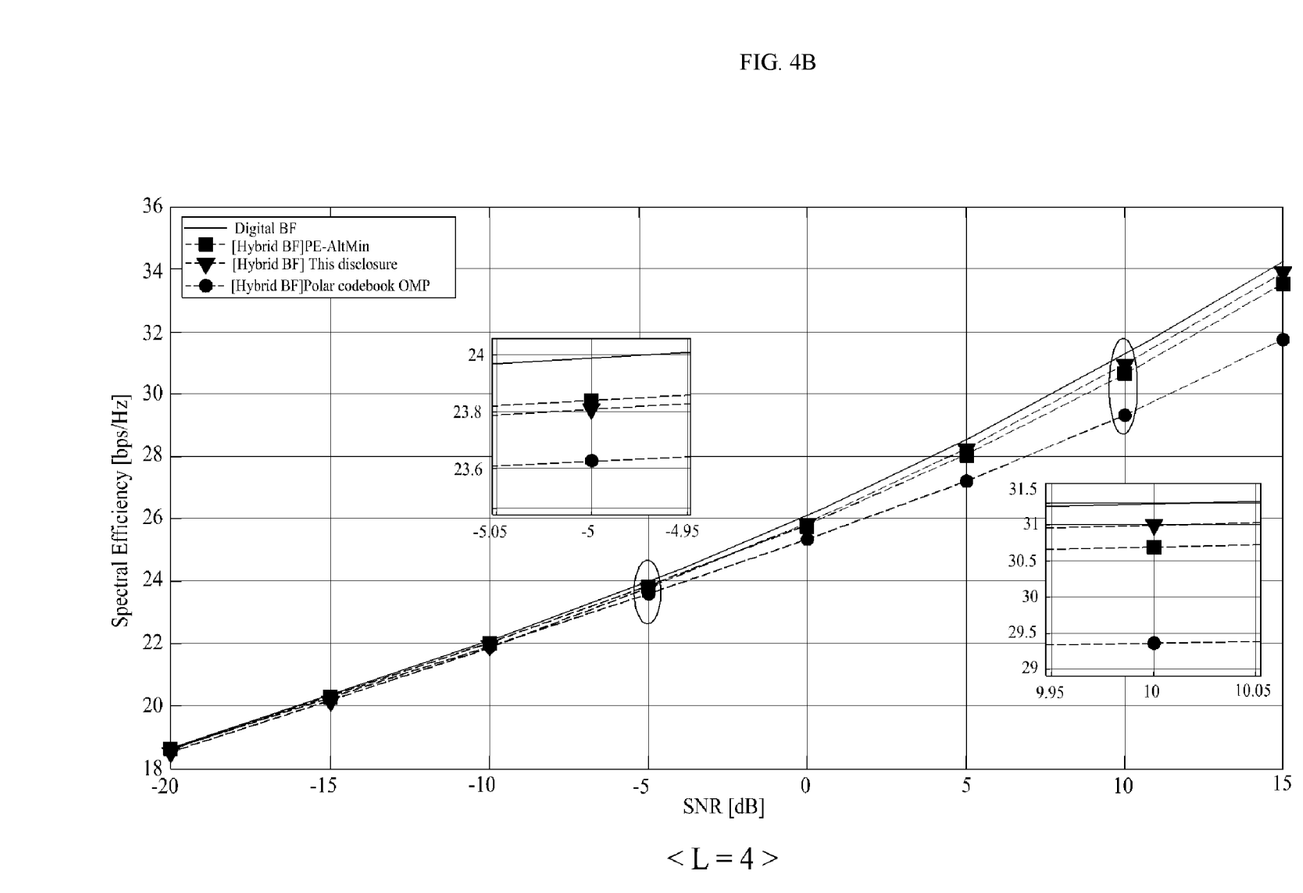
Figure 4C:
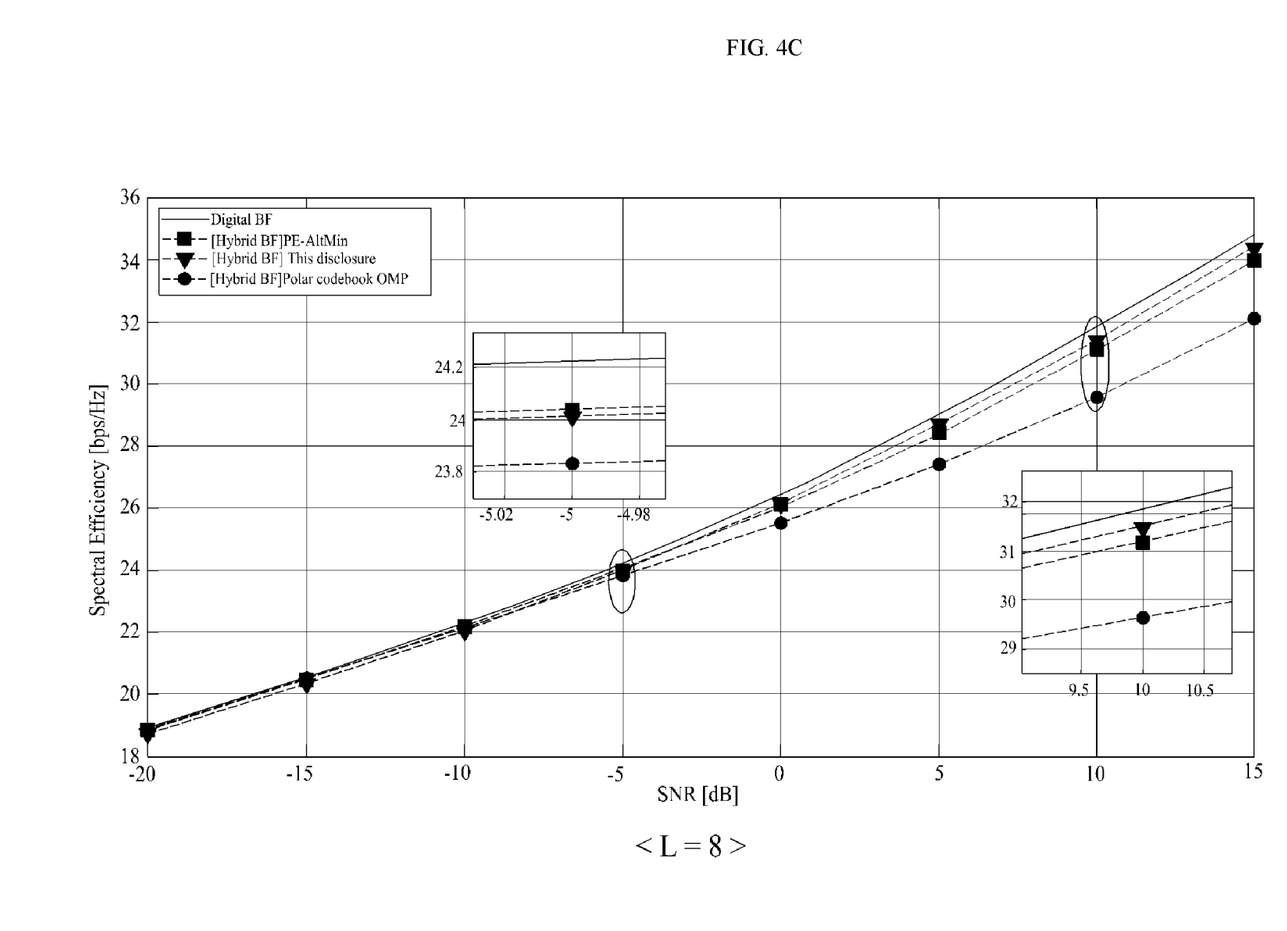

FIGS. 4A, 4B, and 4C are drawings showing simulations results related to the disclosure.

Referring to FIGS. 4A, 4B, and 4C, regarding the disclosure, a simulation was performed. The simulation was performed in a XL-MIMO environment which is configured with that the number $N_{TX}$ of transmitting antennas is 128 and the number $N_{RF}^{TX}$ of RF chains is 2 in the transmitter 110, and the number $N_{RX}$ of receiving antennas is 64, the number $N_{RF}^{RX}$ of RF chains is 2, and L=2, 4, 8 in the receiver 120. FIGS. 4A, 4B, and 4C represent data rate according to SNR when transmitting data stream $N_s$=2 by using an OFDM system with size of K=64. When central frequency is 28 GHz, antenna aperture is 337.5 mm, $D_{Rayleigh}$ is 21.26 m, and $D_{Reactive}$ (it represents boundary line of a reactive near field, and communication is not possible within a distance $$\left(D_{Reactive} = 0.62\sqrt{\frac{A^3}{\lambda_c}}\right)$$

) is 0.95 m, so a distance of a LoS channel is a result of experiment in $D_{Reactive}<D<D_{Rayleigh}\times 1.15(0.95$ m$<D<19.87$ m) environment. According to FIGS. 4A, 4B, and 4C, as the SNR increases, the data rate performance of the proposed technology is superior to that of the existing OFDM-based hybrid beamforming method.

Figure 5:
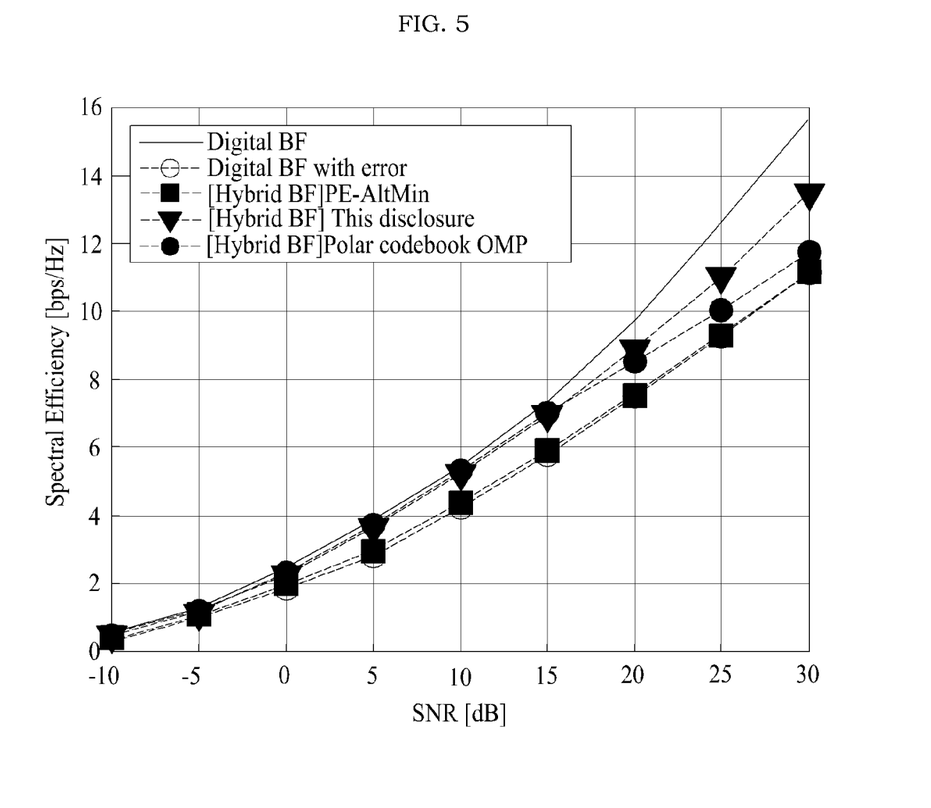
FIG. 5 is a drawing showing another simulation result related to the disclosure.

FIG. 5 is a drawing showing another simulation result related to the disclosure.

Referring to FIG. 5, regarding the disclosure, a simulation was performed. In FIG. 5, in case of a LoS channel, channel estimation is possible when a distance between a transmitter 110 and a receiver 120 and physical AoA and AoD are known, but an estimation error may occur in a NLoS channel, so considering this case, it represents a result of experiment in a narrow band channel environment. According to FIG. 5, by designing beamforming by dividing the LoS and NLoS channels, it may be confirmed that it is robust to errors occurred in the NLoS, and it is superior to a codebook-based design method.

The disclosure may be applied to a communication system to which a beyond 5G mobile communication system and other wideband OFDM hybrid beamforming systems are applied. The disclosure may be applied to millimeter wave (30 GHz-300 GHz) and subterahertz (0.1 THz-1 THz) beamforming which are core technologies of 5G and beyond 5G mobile communication systems. The millimeter wave and subterahertz communication technologies are receiving a lot of attention not only from academia but also from industry, and through the disclosure, it is possible to achieve technical superiority in beyond 5G mobile communication markets. According to the disclosure, the wideband extremely large array antenna system may significantly increase data rate compared to existing technologies through an OFDM-based optimal hybrid beamforming design that technically maximizes data rate of a multi-user downstream link. Furthermore, the wideband extremely large array antenna system will be able to lead beyond 5G mobile communication technology markets by economically applying it to subterahertz beamforming.

In summary, the disclosure provides the wideband extremely large array antenna system 100 and an OFDM-based hybrid beamforming method for hybrid-field interference control of the same.

The OFDM-based hybrid beamforming method of the wideband extremely large array antenna system 100 of the disclosure may include designing a common analog beamforming matrix for all subcarriers between the transmitter 110 and the receiver 120 Step 310, and designing a baseband beamforming matrix for each of the subcarriers Step 320.

According to various example embodiments, in the wideband extremely large array antenna system 100, there may be a hybrid-field composed of a near-field and a far-field between the transmitter 110 and the receiver 120.

According to various example embodiments, the designing the analog beamforming matrix Step 310 may include acquiring oblique projection matrixes of the near-field and the far-field in channel information of the subcarriers by using AoA and AoD information between the transmitter 110 and the receiver 120, and designing the analog beamforming matrix by using the oblique projection matrixes.

According to various example embodiments, the designing the analog beamforming matrix Step 310 may design the analog beamforming matrix by extracting dominant eigenvectors through eigenvalue decomposition of virtual analog beamforming matrixes for the subcarriers.

According to various example embodiments, the designing the analog beamforming matrix by using the oblique projection matrixes may include acquiring channels of the near-field and the far-field for each of the subcarriers by using the oblique projection matrixes, acquiring individual analog beamforming matrix for each of the subcarriers by accumulating virtual analog beamforming matrixes for each of the subcarriers in response to the channels and applying singular value decomposition, and designing the analog beamforming matrix by extracting dominant eigenvectors through eigenvalue decomposition of individual analog beamforming matrixes of the subcarriers.

According to various example embodiments, the designing the analog beamforming matrix Step 310 may extract many dominant eigenvectors as the number of RF chains.

According to various example embodiments, the designing the baseband beamforming matrix Step 320 may design the baseband beamforming matrix by using the dominant eigenvectors.

According to various example embodiments, after designing the baseband beamforming matrix Step 320, aligning data streams between the transmitter and the receiver through singular value decomposition may be further included.

According to various example embodiments, the transmitter 110 may have a plurality of the transmit antennas, and use RF chains less than or equal to the number of the transmit antennas, and the receiver 120 may have a plurality of receiving antennas, and use RF chains less than or equal to the number of the receiving antennas.

The wideband extremely large array antenna system 100 for OFDM-based hybrid beamforming of the disclosure may include a transmitter 110 having a plurality of transmit antennas, and a receiver 120 capable of communication with the transmitter and having a plurality of receiving antennas, and the system may be configured to perform a first step Step 310 for designing a common analog beamforming matrix for all subcarriers between the transmitter 110 and the receiver 120, and a second step Step 320 for designing a baseband beamforming matrix for each of the subcarriers.

According to various example embodiments, in the wideband extremely large array antenna system 100, there may be a hybrid-field composed of a near-field and a far-field between the transmitter 110 and the receiver 120.

According to various example embodiments, the first step Step 310 may be configured to acquire oblique projection matrixes of the near-field and the far-field in channel information of the subcarriers by using AoA and AoD information between the transmitter 110 and the receiver 120, and design the analog beamforming matrix by using the oblique projection matrixes.

According to various example embodiments, the first step Step 310 may be configured to design the analog beamforming matrix by extracting dominant eigenvectors through eigenvalue decomposition of virtual analog beamforming matrixes for the subcarriers.

According to various example embodiments, the first step Step 310 may be configured to acquire channels of the near-field and the far-field for each of the subcarriers by using the oblique projection matrixes, acquire individual analog beamforming matrix for each of the subcarriers by accumulating virtual analog beamforming matrixes for each of the subcarriers in response to the channels and applying singular value decomposition, and design the analog beamforming matrix by extracting dominant eigenvectors through eigenvalue decomposition of individual analog beamforming matrixes of the subcarriers.

According to various example embodiments, the first step Step 310 may be configured to extract many dominant eigenvectors as the number of RF chains.

According to various example embodiments, the second step Step 320 may be configured to design the baseband beamforming matrix by using the dominant eigenvectors.

According to various example embodiments, the wideband extremely large array antenna system 100 may be configured to, after the second step, align data streams between the transmitter 110 and the receiver 120 through singular value decomposition.

According to various example embodiments, the transmitter 110 may use RF chains less than or equal to the number of the transmit antennas, and the receiver 120 may use RF chains less than or equal to the number of the receiving antennas.

The aforementioned method may be provided as a computer program recorded on a computer-readable recording medium in order to be executed in a computer. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include recording media and/or storage media managed in an app store in which apps are distributed, a site in which various other pieces of software are supplied or distributed, a server, etc.

The methods, operations or schemes of the disclosure may be implemented by various means. For example, such schemes may be implemented as hardware, firmware, software, or a combination of them. Those skilled in the art will understand that various exemplary logical blocks, modules, circuits, and algorithm steps described in association with the disclosure may be implemented as electronic hardware, computer software, or combinations of them. In order to clearly describe such a mutual substitution of hardware and software, various exemplary components, blocks, modules, circuits, and steps have been generally described above from their functional viewpoints. Whether such a function is implemented as hardware or implemented as software is different depending on design requirements assigned to a specific application and the entire system. Those skilled in the art may implement a function described in various manners for each specific application, but such implementations should not be construed as departing from the scope of the disclosure.

In a hardware implementation, processing units used to perform schemes may be implemented within one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform functions described in the disclosure, a computer, or a combination of them.

Accordingly, various exemplary logical blocks, modules, and circuits described in association with the disclosure may be implemented or performed as a general-purpose processor, a DSP, an ASIC, an FPGA or another programmable logical device, a discrete gate or transistor logic, discrete hardware components or a given combination of them designed to perform functions described in the present disclosure. The general-purpose processor may be a microprocessor, but alternatively, the processor may be a given conventional processor, controller, microcontroller, or state machine. Furthermore, the processor may be implemented as a combination of computing devices, for example, a DSP and a microprocessor, a plurality of microprocessors, one or more microprocessors associated with a DSP core, or a combination of given other components.

In firmware and/or software implementation, schemes may be implemented as instructions stored in a computer-readable medium, such as a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a compact disc (CD), a magnetic or optical data storage device. The instructions may be executed by one or more processors and may enable a processor(s) to perform specific aspects of a function described in the disclosure.

The aforementioned embodiments have been described as using aspects of the subject matter now disclosed in one or more independent computer systems, but the disclosure is not limited thereto and may be implemented in association with a network or a given computing environment, such as a distributed computing environment. Furthermore, in the disclosure, aspects of the subject matter may be implemented in a plurality of processing chips or devices, and storage may be similarly influenced in a plurality of devices. Such devices may include PCs, network servers, and portable devices.

Although the disclosure has been described in relation to some embodiments, the disclosure may be modified and changed in various ways without departing from the scope of the disclosure which may be understood by those skilled in the art to which an invention of the disclosure belongs. Furthermore, such a modification and change should be considered as belonging to the scope of the claims appended in the specification.

The invention claimed is:

1. An OFDM-based hybrid beamforming method of a wideband extremely large array antenna system, comprising:
   designing a common analog beamforming matrix for all subcarriers between a transmitter and a receiver;
   designing a baseband beamforming matrix for each of the subcarriers; and
   after designing the baseband beamforming matrix, aligning data streams between the transmitter and the receiver through singular value decomposition.

2. The OFDM-based hybrid beamforming method of claim 1, wherein in the wideband extremely large array antenna system, there is a hybrid-field composed of a near-field and a far-field between the transmitter and the receiver, and
   wherein the designing the analog beamforming matrix comprises:
   acquiring oblique projection matrixes of the near-field and the far-field in channel information of the subcarriers by using arrival angle and departure angle information between the transmitter and the receiver; and
   designing the analog beamforming matrix by using the oblique projection matrixes.

3. The OFDM-based hybrid beamforming method of claim 2, wherein the designing the analog beamforming matrix by using the oblique projection matrixes comprises:

acquiring channels of the near-field and the far-field for each of the subcarriers by using the oblique projection matrixes;

acquiring individual analog beamforming matrix for each of the subcarriers by accumulating virtual analog beamforming matrixes for each of the subcarriers in response to the channels and applying singular value decomposition; and designing the analog beamforming matrix by extracting dominant eigenvectors through eigenvalue decomposition of individual analog beamforming matrixes of the subcarriers.

4. The OFDM-based hybrid beamforming method of claim 1, wherein the transmitter has a plurality of the transmit antennas, and uses RF chains less than or equal to the number of the transmit antennas, and the receiver has a plurality of receiving antennas, and uses RF chains less than or equal to the number of the receiving antennas.

5. An OFDM-based hybrid beamforming method of a wideband extremely large array antenna system, comprising:

designing a common analog beamforming matrix for all subcarriers between a transmitter and a receiver;

designing a baseband beamforming matrix for each of the subcarriers, wherein the designing the analog beamforming matrix designs the analog beamforming matrix by extracting dominant eigenvectors through eigenvalue decomposition of virtual analog beamforming matrixes for the subcarriers.

6. An OFDM-based hybrid beamforming method of a wideband extremely large array antenna system, comprising:

designing a common analog beamforming matrix for all subcarriers between a transmitter and a receiver;

designing a baseband beamforming matrix for each of the subcarriers, wherein the designing the analog beamforming matrix extracts many dominant eigenvectors as the number of RF chains.

7. The OFDM-based hybrid beamforming method of claim 6, the designing the baseband beamforming matrix designs the baseband beamforming matrix by using the dominant eigenvectors.

* * * * *